United States Patent
Slonneger et al.

(10) Patent No.: US 9,383,818 B2
(45) Date of Patent: Jul. 5, 2016

(54) METHOD AND SYSTEM FOR TILT-BASED ACTUATION

(71) Applicant: Motorola Mobility LLC, Libertyville, IL (US)

(72) Inventors: Andrew M Slonneger, Crystal Lake, IL (US); Sajid I Dalvi, Aurora, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 81 days.

(21) Appl. No.: 14/141,532

(22) Filed: Dec. 27, 2013

(65) Prior Publication Data

US 2015/0185836 A1 Jul. 2, 2015

(51) Int. Cl.
*G06F 3/0346* (2013.01)
*G06F 3/0485* (2013.01)
*G06F 3/01* (2006.01)
*G06F 1/16* (2006.01)
*H04M 1/725* (2006.01)

(52) U.S. Cl.
CPC ............... *G06F 3/014* (2013.01); *G06F 1/163* (2013.01); *G06F 3/017* (2013.01); *G06F 3/0346* (2013.01); *G06F 3/0485* (2013.01); *G06F 1/1694* (2013.01); *G06F 2200/1637* (2013.01); *H04M 1/72519* (2013.01); *H04M 2250/12* (2013.01)

(58) Field of Classification Search
CPC combination set(s) only.
See application file for complete search history.

(56) References Cited

U.S. PATENT DOCUMENTS

| | | | |
|---|---|---|---|
| 6,624,824 B1 | 9/2003 | Tognazzini et al. | |
| 8,381,102 B1 | 2/2013 | Scholler | |
| 2006/0094480 A1* | 5/2006 | Tanaka | G06F 1/1613 455/575.1 |
| 2007/0176898 A1 | 8/2007 | Suh | |
| 2009/0195497 A1* | 8/2009 | Fitzgerald | G06F 1/3203 345/156 |
| 2012/0223884 A1 | 9/2012 | Bi et al. | |
| 2013/0176346 A1 | 7/2013 | Chen | |
| 2013/0222243 A1* | 8/2013 | Jung | G06F 1/1694 345/158 |
| 2013/0234924 A1 | 9/2013 | Janefalkar et al. | |

FOREIGN PATENT DOCUMENTS

| | | |
|---|---|---|
| EP | 0 805 389 A2 | 11/1997 |
| WO | 2004021166 A1 | 3/2004 |
| WO | 2006124935 A2 | 11/2006 |

OTHER PUBLICATIONS

International Search Report and Written Opinion of International Application No. PCT/US2014/069741, mailed Mar. 30, 2015 13 pp.
Droid Life, "Google Chrome for Android Preview: Tilt Scrolling", YouTube video: http://www.youtube.com/watch?v=2bzdcw6WSr8, Feb. 7, 2012, 3 pages.
Imangi Studios, "Temple Run"—Android Apps on Google Play, updated Jan. 9, 2014, 3 pages.
Andrew Slonneger et al., "Method and System for Gesture Recognition", U.S. Appl. No. 13/800,743, filed Mar. 13, 2013, 68 pages.

* cited by examiner

*Primary Examiner* — Robin Mishler
(74) *Attorney, Agent, or Firm* — Shumaker & Sieffert, P.A.

(57) ABSTRACT

An electronic device, system associated therewith, and method of operating an electronic device are disclosed. In one example embodiment, the method includes storing 310 a first base tilt position of the electronic device based upon at least one position signal received by a processing device at least indirectly from a position or movement sensing component. The method additionally includes defining 312 a plurality of tilt zones in relation to the base tilt position, including a base tilt zone containing the base tilt position, determining 324 whether a tilt position of the device has changed to a second tilt zone of the plurality of tilt zones, and causing 328 a display component of the device to perform displaying of information in a scrolling manner determined at least in part based upon the second tilt zone.

20 Claims, 6 Drawing Sheets

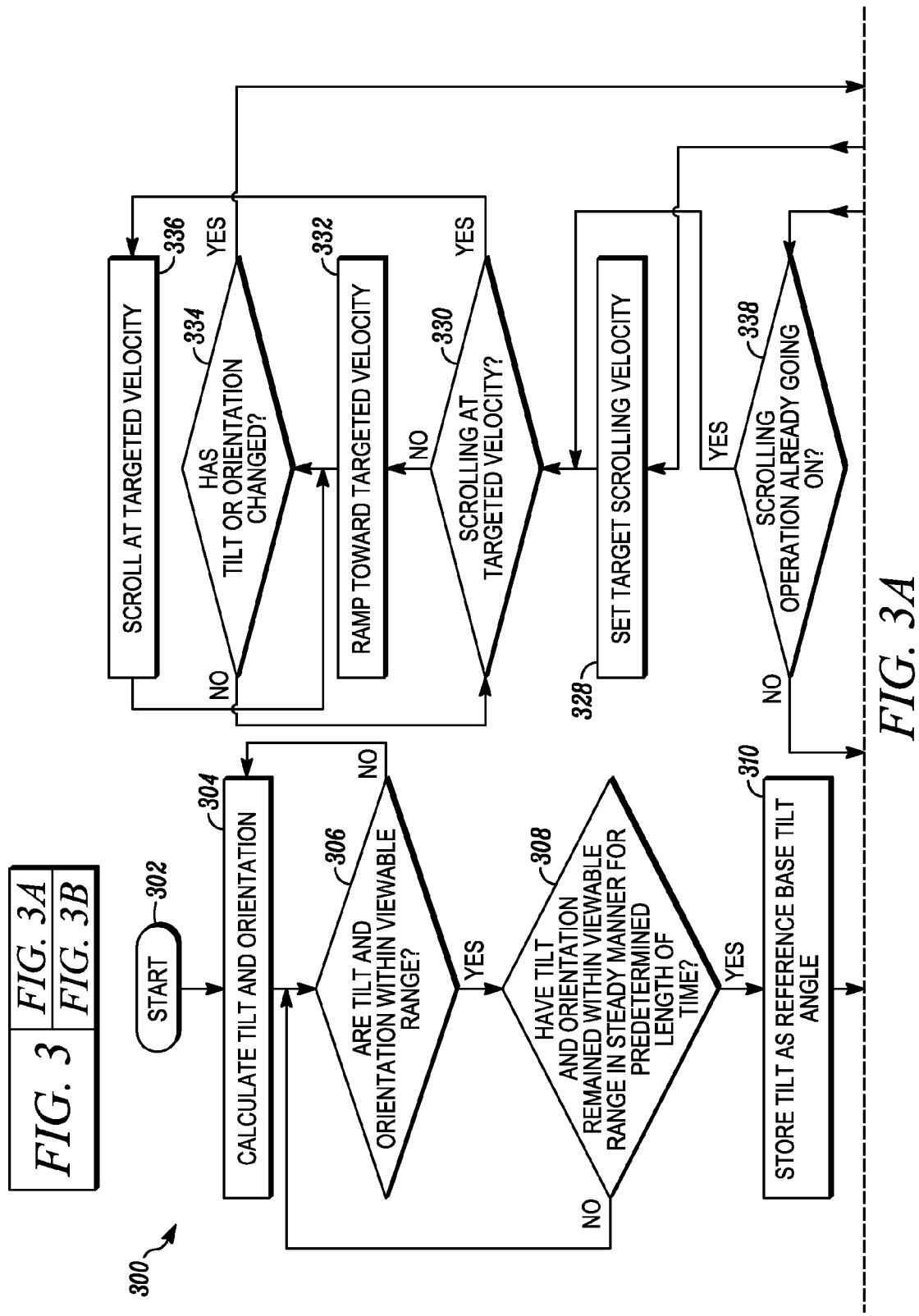

METHOD AND SYSTEM FOR TILT-BASED ACTUATION

FIELD OF THE DISCLOSURE

The present disclosure relates to electronic devices such as mobile devices and, more particularly, to methods and systems for allowing electronic devices to receive user inputs.

BACKGROUND OF THE DISCLOSURE

Mobile devices such as wrist watches, smart phones, tablet computers, and gaming controllers are ubiquitous and utilized for many purposes. As the applications of such mobile devices have grown in number and complexity, the desire to facilitate a variety of user inputs to the mobile devices has grown. Indeed, in relation to a variety of mobile devices, there is an ongoing and increased opportunity for additional new or enhanced methods of supporting user inputs to the mobile devices.

In at least some mobile devices, especially ones such as wristwatches that have displays of relatively modest size, scrolling of electronically-displayed text or images can be of importance. Yet when a mobile device such as a wristwatch is worn on a user's wrist adjoining one of the two hands of the user, it often is inconvenient when the user, in order to actuate scrolling on the wristwatch, can only do so by providing input signals by way of the user's other hand.

Additionally, even when a user holds the mobile device rather than wears it on a wrist, it can both be inconvenient to the user if the user needs to actuate scrolling by way of the user's other hand and also be inconvenient if the user needs to resort to actuating the scrolling by way of the hand holding the smart phone, for example, by way of the thumb of the grasping hand. Indeed, in the latter case, one-handed touch scrolling by way of a user's thumb is not always comfortable (e.g., small hands) or stable (e.g., it is easy to drop the phone).

For at least these reasons, as well as other reasons, it would be advantageous to develop one or more additional new or enhanced methods of allowing user inputs to mobile devices, as well as one or more additional new or enhanced mobile devices or related systems having such capabilities.

DETAILED DESCRIPTION

Figure 1:
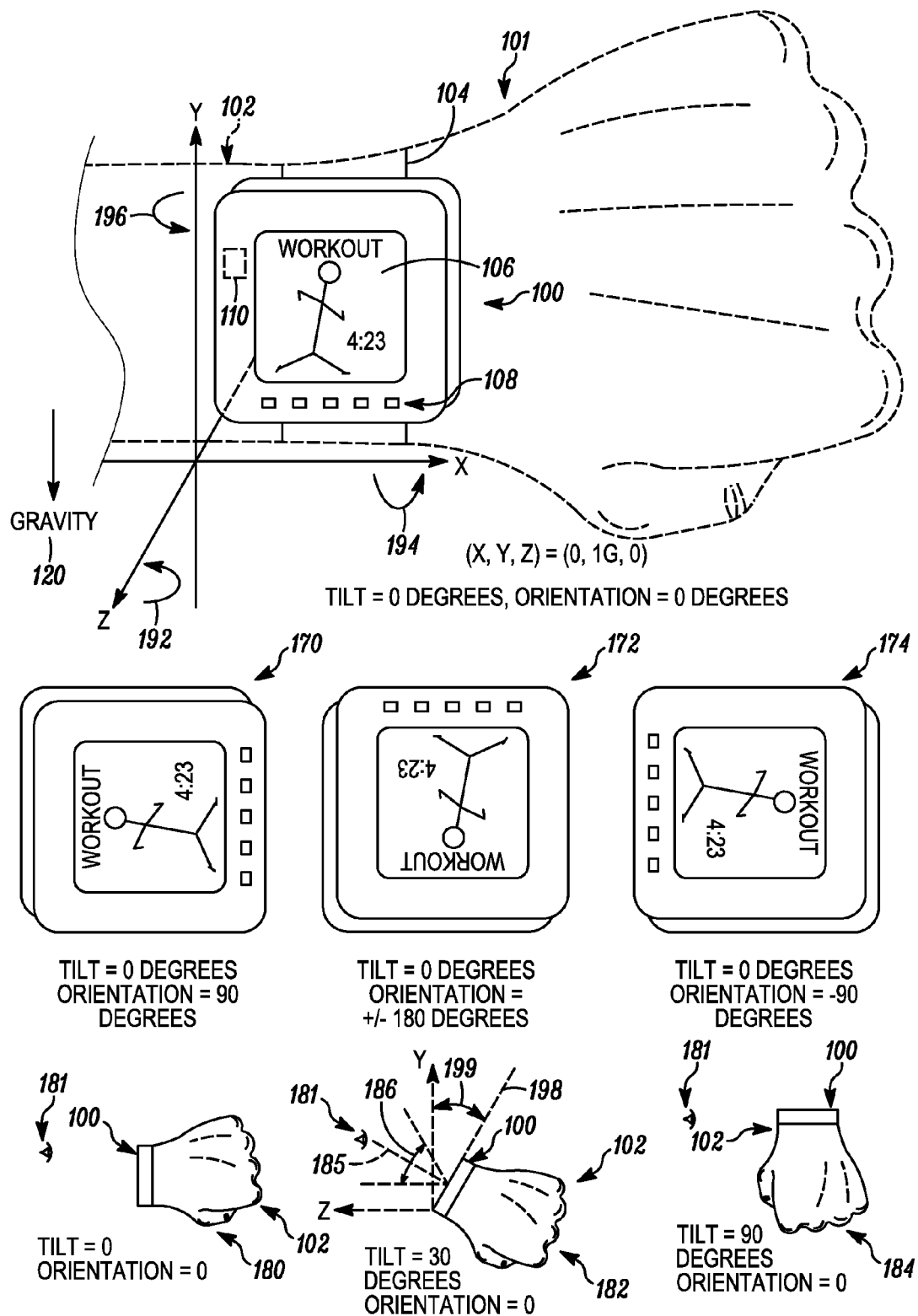
FIG. 1 shows in schematic form an example electronic device, which in the present example is a mobile device that more particularly is a wristwatch, positioned on a user's lower arm (shown in phantom) and in relation to example coordinate axes, and further shows the electronic device in three alternative tilt arrangements.

The present disclosure relates to any of a variety of electronic devices including mobile devices such as wristwatches, game interfaces, and smart phones in which wrist rotations (and even small or slight wrist rotations) can serve as a natural input mechanism to the device. In at least some embodiments, the wrist rotational (or other) movements particularly can be employed by a user to control scrolling (e.g., vertical scrolling) of text and/or images appearing on a display associated with the electronic device, and this can be particularly helpful in the case of electronic devices that have a small display (e.g., a small watch display). Further, in at least some such embodiments, the scrolling control achieved by the wrist rotation movements provides a simple, convenient manner of achieving scrolling operation that is both well-controlled and smooth in operation.

More particularly, in at least some embodiments, scrolling operation commences when the position of the electronic device comes into a steady viewable angle for a certain duration of time, at which point a reference tilt angle is set and tilt angles near the reference tilt angle are associated with a target scrolling velocity of zero (0). Then, as the actual tilt angle deviates far enough in either direction due to the user's movement/rotation of the user's wrist, the deviation is used to set a new target velocity, new target position (e.g., what position along the displayed content is to be displayed), and acceleration. For smooth scrolling, at any point in time, the current velocity of the scrolling animation is based on calculations using the past velocity, the target velocity, the acceleration, and the target position.

Further, in at least some embodiments, the present disclosure relates to a method of operating an electronic device. The method includes storing a base tilt position of the electronic device based upon at least one position signal received by a processing device at least indirectly from a position or movement sensing component, and defining a plurality of tilt zones in relation to the base tilt position, including a base tilt zone containing the base tilt position. The method also includes determining whether a tilt position of the electronic device has changed to a second tilt zone of the plurality of tilt zones, and causing a display component of the electronic device to perform displaying of information in a scrolling manner, the scrolling manner being determined at least in part based upon the second tilt zone.

Additionally, in at least some embodiments, the present disclosure relates to a method of operating a wristwatch device. The method includes first determining, based at least in part upon a first position signal received by a processing device, that a first base tilt position of the electronic device is within a first viewable range and has remained steady or substantially steady for a first period of time. The method additionally includes storing within a memory component of the wristwatch device a first base tilt value corresponding to the first base tilt position and determining a base tilt zone containing the base tilt value. The method further includes second determining a plurality of additional tilt zones in relation to a base tilt zone, third determining whether a tilt position of the electronic device has changed from being within a first tilt zone to being within a second tilt zone, and causing at least one component of the electronic device to perform an action based at least in part upon the second tilt zone.

Further, in at least some embodiments, the present disclosure relates to an electronic device configured for allowing a user to view information in a scrolling manner. The electronic device includes a display device having a display surface having a tilt position associated therewith, the tilt position being variable in dependence upon a rotational orientation of the electronic device and the display device thereof about a first axis, and a position sensing device configured to provide at least one position signal indicative of a plurality of values of the tilt position at a plurality of respective different times. The electronic device additionally includes a processing device at least indirectly coupled to the display device and the position sensing device and configured to receive the at least one position signal, where the processing device is further configured to cause the display device to display information in a scrolling manner at a scrolling velocity depending at least in part upon a target velocity that in turn is based at least in part upon at least some of the values of the tilt position that are indicative of a change in the tilt position.

Referring to FIG. 1, an example electronic device 100 is a wristwatch-type product (or simply a wristwatch) shown in a first image 101 to be positioned on and supported by a lower arm or wrist 102 of a user (shown in phantom) using a wristband 104. Given this arrangement, the electronic device 100 moves along with the lower arm 102 when the user moves the lower arm as described below. In this drawing, the electronic device 100 is worn on a dorsal side of a left wrist. The wristwatch, however, can worn in a variety of ways including on the left or right arm, on the dorsal side or the palmar side. Note also that the band 104 can be tighter or looser depending on user preference.

In the present embodiment, the electronic device 100 particularly includes a display 106 that is able to display any of a variety of types of information, text, or visual imagery. FIG. 1 particularly shows the display 106 as including a time and a message, for example, as would be displayed when used as a stopwatch or a wristwatch, and this time and message information is all simultaneously visible on the display 106 as shown. Nevertheless, as will be described further below, the electronic device 100 in the present embodiment additionally is capable of displaying, and configured to display, information, text, or visual imagery that exceeds the size of the display 106 such that, to view that information, text, or visual imagery, it is desirable for the user to be able to cause scrolling of that information, text, or visual imagery, which will hereinafter collectively be referred to generally as "scrollable information". In addition to the display 106, in the present embodiment the electronic device 100 also has a number of discrete keys or buttons 108 that serve as input components of the electronic device. However, in other embodiments these keys or buttons (or any particular number of such keys or buttons) can be implemented using a touchscreen display or other alternate technologies.

Although FIG. 1 particularly shows the electronic device 100 as including keys or buttons 108, these features are only intended to be examples of components/features on the electronic device, and in other embodiments the electronic device need not include one or more of these features and/or can include other features in addition to or instead of these features. Further, although FIG. 1 shows the electronic device 100 to be a wristwatch, the electronic device 100 is intended to be representative of a variety of electronic devices including other personal electronic devices and mobile devices such as, for example, smart phones, cellular telephones, personal digital assistants (PDAs), radios, tablet computers (including, for example, tablet computers having a vertical strap along the back of the respective device that allows the device to be strapped to the palm of a user's hand), or other handheld or portable electronic devices. In alternate embodiments, the electronic device can be a headset, eyeglasses, an armband, or another form of wearable electronic device, including a media player (e.g., MP3, MP4, DVD, ebook), a media recorder (e.g., digital or video camera), a gaming controller, an exercise or activity tracker, or a remote controller. More examples include a navigation device, a laptop or notebook computer, a netbook, a pager, or another type of communication device. Indeed, embodiments of the present disclosure are intended to encompass or be applicable to any of a variety of electronic devices that are capable of or configured for recognizing spatial gestures.

In addition to the above-described components, the electronic device 100 further includes a three-dimensional (3D) accelerometer 110 (shown in phantom) that is configured to sense movements/accelerations of the electronic device. By virtue of the accelerometer 110, the electronic device is able to sense accelerations along x, y, and z axes as also shown in FIG. 1, which (as discussed below) particularly allows the electronic device to sense spatial gestures as described below. In the present embodiment, the y-axis is defined to be the vertical axis (up/down relative to the display), the x-axis is defined to be the horizontal axis (left/right relative to the display), and the z-axis is defined to be the depth axis (in/out relative to the display). However, it should be appreciated that the orientations of these axes are merely exemplary and based on common convention.

Given the orientations of the axes as shown in FIG. 1 and the orientation of the electronic device 100 with respect to the force of gravity 120 with all acceleration due to gravity along the y-axis, a raw data point with 3D acceleration can be represented as (x, y, z), and a magnitude of acceleration is defined by:

$$\text{mag}=|(x,y,z)|=\sqrt{x^2+y^2+z^2} \qquad (1)$$

Thus, when the electronic device 100 and lower arm 102 are positioned as shown in FIG. 1 in a rest (non-moving) state, the detected values of the accelerometer along the x, y, and z axes (x, y, z) are (0, 1G, 0), where G is acceleration due to gravity, and the overall magnitude of acceleration of the stationary device will be 1G.

Further referring to FIG. 1, it will be appreciated that movement of the lower arm 102 can cause variation in the rotational positions of the electronic device 100 about the x, y, and z axes (or about axes substantially parallel to those axes), as illustrated by curved arrows 194, 196, and 192, respectively (it being understood that rotations can occur both in the directions indicated by those arrows and in directions opposite the directions indicated by those arrows). In the present discussion, rotation about the x axis (or an axis substantially parallel to that axis) in the present embodiment will particularly be referred to as tilt rotation and, depending upon the amount of tilt rotation that occurs, the electronic device 100 will take on various tilt positions (or tilt angles or tilt levels). By comparison, rotation about the z axis (or an axis substantially parallel to that axis) in the present embodiment will particularly be referred to as orientation rotation and, depending upon the amount of orientation rotation that occurs, the electronic device 100 will take on various different orientation positions (or orientation angles or orientation levels).

It should be noted that, for reference, in the present embodiment, the "right hand rule" dictates the sign of the angular velocity around an axis. The arrows 192, 194, and 196 of FIG. 1 each respectively show positive angular velocity direction for each direction. That is, in the present embodiment, the sign of the angular velocity around the x-axis represented by the arrow 194 is positive if one moves rotationally in the direction of changing from facing +z to facing −y (decrease tilt from 0 degrees), the sign of the angular velocity around the y-axis represented by the arrow 196 is positive if one moves rotationally in the direction of changing from facing +z to facing +x, and the sign of the angular velocity around the z-axis represented by the arrow 192 is positive if one moves rotationally in the direction of increasing orientation from 0 degrees (within the x-y plane established by the x-axis and y-axis). Nevertheless, notwithstanding the particular definitions of positive versus negative rotations about the x-axis, y-axis, and z-axis, rotations in either the positive or negative directions can occur about each of the axes.

Further with respect to FIG. 1, FIG. 1 includes respective first, second, third, fourth, fifth, and sixth additional images 170, 172, 174, 180, 182, and 184 of the electronic device 100 to illustrate different example variations in the rotational positions of the electronic device. The first, second, and third additional images 170, 172, and 174 show the electronic device 100 in respective first, second, and third orientation positions (but with the same tilt positions) differing from the position of the electronic device as shown on the lower arm 102 in the first image 101. By comparison, the fourth, fifth, and sixth additional images 180, 182, and 184 show the electronic device 100 in respective first, second, and third tilt positions (but with the same orientation positions), it being understood that the tilt position illustrated in the fourth additional image 180 is the same tilt position as is illustrated in the first image 101 of FIG. 1.

Additionally with respect to the first, second, and third additional images 170, 172, and 174, in contrast to the orientation value of the electronic device 100 when positioned on the lower arm 102 as shown in the first image 101, which is an orientation of 0 degrees (with the device being stationary and positioned such that the x-axis is horizontal and the y-axis is vertical with the positive portion of the y-axis pointing vertically upward), the first additional image 170 shows the electronic device 100 having an orientation of +90 degrees (with (x,y,z)=(1G, 0, 0)), the second additional image 180 shows the electronic device 100 having an orientation of +/−180 degrees (with (x,y,z)=(0, −1G, 0)), and the third additional image 190 shows the electronic device having an orientation of −90 degrees (with (x,y,z)=(−1G, 0, 0)), where orientation can be calculated as follows:

$$\text{orientation} = a\tan 2(x, y) \quad (2)$$

As already noted above, rotations of the electronic device 100 to achieve different orientations can be understood to be rotations generally about the z-axis (or about an axis parallel to the z-axis) as represented by an arrow 192.

Although the first image 101 as well as the additional images 170, 172, and 174 of FIG. 1 all show the electronic device 100 in various positions that all correspond to a tilt value of zero, as already noted above the electronic device can attain different levels of tilt given appropriate further movement of the lower arm 102 supporting the electronic device. More particularly, changes in the tilt position (or tilt angle or tilt level or tilt value or simply the tilt) of the electronic device 100 can be achieved by rotations of the user's wrist, generally about the x-axis (or about an axis parallel to the x-axis) either in the direction represented by an arrow 194 or in the opposite direction. The tilt position (or tilt angle or tilt level) of the electronic device 100 in the present embodiment particularly can be calculated according to the following equation:

$$\text{tilt} = a\sin\left(\frac{z}{mag}\right) \quad (3)$$

In accordance with this equation, the tilt position (or tilt angle or tilt level) of the electronic device 100 as shown in the first image 101 as well as in the fourth additional image 180 is zero. Alternatively, if the electronic device 100 is rotated about the x-axis in a manner contrary to the direction indicated by the curved arrow 194, the tilt position changes (increases) from zero up to a higher level.

The fifth additional image 182 particularly illustrates a circumstance in which the electronic device 100 has been rotated so that the front face is parallel with a tilt axis 198 such that a tilt angle (or tilt position or tilt level) 199 of the electronic device is +30 degrees. And as a further example, the sixth additional image 184 shows the electronic device 100 to be rotated so that the front face of the electronic device 100 points up, in which case the electronic device has a tilt angle (or tilt position or tilt level or tilt value) of +90 degrees (and the acceleration values of the device will be (0,0,1G)). Although not shown, it should also be appreciated that, if the electronic device 100 is moved so that the front face points down, then the electronic device will have a tilt value of −90 degrees (and (0,0,−1G) as acceleration values).

In the present embodiment and at least some other embodiments encompassed herein, the acceleration input (x,y,z) provided by the accelerometer 110, along with tilt and orientation values determined based thereon, can be used to assess whether the electronic device 100 has reached a position that is a user-viewable position or angle, and has remained steadily (or substantially steadily) in that position for a sufficient length of time that it is appropriate to determine or set a reference tilt angle. Further, this information (again, the acceleration input (x,y,z) provided by the accelerometer 110, along with tilt and orientation values) can be subsequently utilized to determine variations in the tilt angle (e.g., relative to the reference tilt angle) and, based upon such determined variations, to set a new target velocity, new target position, and/or acceleration for scrolling operation.

More particularly, in the present embodiment a scrolling operation of the electronic device 100 can be controlled by the user (or operator) based upon movement of the user's lower arm 102. Such scrolling operation particularly is controlled based upon rotational movements of the lower arm 102 that result in changes in the tilt position and/or the orientation position. Of particular interest in this respect is the tilt position because, in the present embodiment, whether the user is able to view (or comfortably view) the information presented on the display 106 depends upon the tilt position of the electronic device (and the display thereof). For example, as particularly illustrated in the fifth additional image 182, when the tilt angle 199 is +30 degrees as shown, a ray 185 extending between the front face of the display 106 and an eye 181 of the user is directly normal to the front face of the display. However, it should be appreciated that, if the tilt angle is increased to +90 degree as shown in the sixth additional image 184, then viewing of the display by the user would be difficult (or at least reduced significantly relative to image 182).

Additionally in view of this discussion, it should also be appreciated that there is a range of tilt angle values at which the user can reasonably comfortably view information on the display 106, extending from a tilt angle that is less than the best tilt angle for viewing (in this example, at the +30 degree level) to a tilt angle that is greater than the best tilt angle for viewing. Such a range of tilt angles is illustrated by an angle range 186 shown in the fifth additional image 182 as extending from an angle below the angle 185 to an angle above the angle 185, and which should be understood to correspond to a range of equal extent about the tilt axis 198. Likewise, although not illustrated particularly in FIG. 1, it also is the case that there is a range of orientation angle values at which the user can reasonably comfortably view information on the display 106. These two ranges of tilt angles and orientation angles are referred to herein further below as a "viewable range" (or "viewable angle region") of the electronic device 100.

In other embodiments, the acceleration input (x,y,z) provided by the accelerometer 110, along with tilt and orientation values, can also be employed for other purposes. For example, in some other embodiments, such information can be used to assess whether the electronic device 100 is in a valid starting position for a particular gesture to occur. Additionally in regard to the definitions of orientation and tilt, it should be appreciated that, even when the electronic device 100 is in motion, these tilt and orientation terms apply. That is, given the positioning of the electronic device 100 on the lower arm 102 as shown in the first image 101 (but not the positioning of the electronic device in any of the first, second, or third additional images 170, 172, and 174), if the wrist in FIG. 1 was moving (as long as it was not rotating around the z-axis), visually one would see and define tilt and orientation to be 0 degrees. That said, in general, the equations for tilt and orientation depend on the device being at rest to allow accurate measurement of tilt and orientation through the use of gravity.

Figure 2:
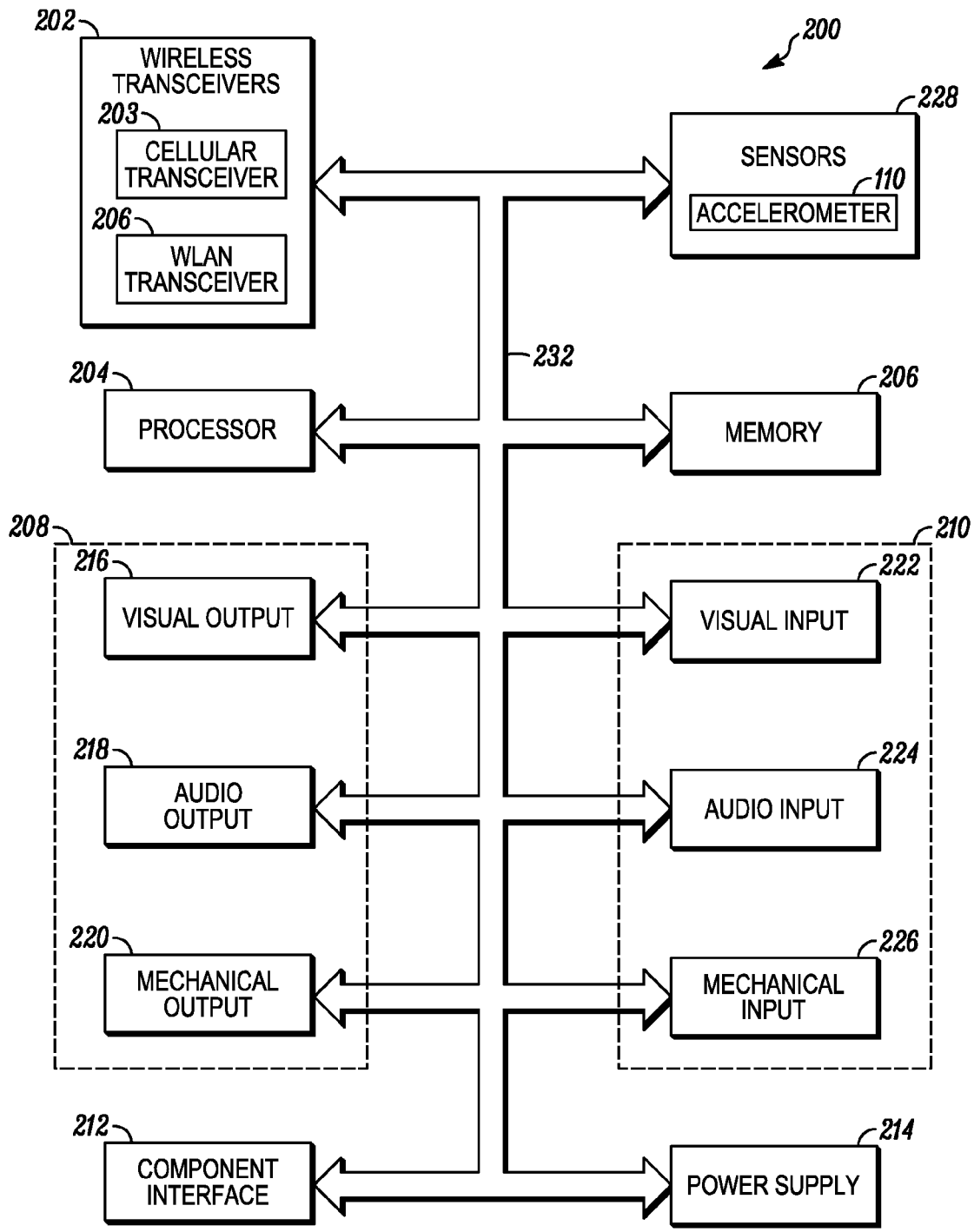
FIG. 2 is a block diagram showing example components of the electronic device of FIG. 1.

FIG. 2 provides a block diagram illustrating example internal components 200 of the electronic device 100 of FIG. 1, which in the present embodiment is a wristwatch having wireless communications capability. As shown in FIG. 2, the internal components 200 of the electronic device 100 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the present embodiment of FIG. 2, the wireless transceivers 202 particularly include a wireless personal area network (WPAN) transceiver 203 and a wireless local area network (WLAN) transceiver 205. More particularly, the WPAN transceiver 203 is configured to conduct short-range wireless communications, using a protocol such as IEEE 802.15 Bluetooth®, IEEE 802.15.4 ZigBee, NFC, RFID, infrared, HomeRF, Home Node B, or others or variants thereof. By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for cellular or non-cellular wireless communications.

Although in the present embodiment the electronic device 100 has two of the wireless transceivers 202 (that is, the transceivers 203 and 205), the present disclosure is intended to encompass numerous embodiments in which any arbitrary number of wireless transceivers employing any arbitrary number of communication technologies are present as well as electronic devices that do not have any wireless communications capability. In the present embodiment, by virtue of the use of the wireless transceivers 202, the electronic device 100 is capable of communicating with any of a variety of other devices or systems (not shown) including, for example, other electronic devices including mobile devices, cell towers, access points, other remote devices, etc. Depending upon the embodiment or circumstance, wireless communication between the electronic device 100 and any arbitrary number of other devices or systems can be achieved.

Operation of the wireless transceivers 202 in conjunction with others of the internal components 200 of the electronic device 100 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio, and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen such as the display screen 106. Likewise, by example, the input device(s) 210 can include one or more visual input devices 222 such as an optical sensor (for example, a camera lens and photosensor), one or more audio input devices 224 such as a microphone, and/or one or more mechanical input devices 226 such as a flip sensor, keyboard, keypad, selection button, navigation cluster, touch pad, capacitive sensor, motion sensor, and/or switch. In the electronic device 100 of FIG. 1, the keys or buttons 108 are among the mechanical input devices 226. Operations that can actuate one or more of the input devices 210 can include not only the physical pressing/actuation of buttons or other actuators, but can also include, for example, opening or unlocking some portion of the electronic device, moving the device to actuate a motion, moving the device to actuate a location positioning system, and operating the device.

As mentioned above, the internal components 200 also can include one or more of various types of sensors 228. In the present embodiment, the sensors 228 particularly include the accelerometer 110 shown in FIG. 1, which can be used for gesture detection and particularly is used in the present embodiment to detect movements of the electronic device 100 (corresponding to movements of the lower arm 102 of the user) that govern or influence scrolling operation. Although in the present embodiment employs the accelerometer 110 for position sensing and motion and gesture detection, in other embodiments other sensor(s) can be used instead of, or in combination with, the accelerometer to perform such sensing and detection. For example, in some alternate embodiments, a gyroscope and/or a barometer can be used instead of, or in addition to, the accelerometer 110. In some embodiments, more than one of these sensors and/or other sensors are present and used for position sensing and motion and gesture detection.

Further, in addition to such sensor(s), depending upon the embodiment, the sensors 228 can include any of a variety of other sensor types including, for example, proximity sensors (e.g., a light detecting sensor, an ultrasound transceiver, or an infrared transceiver), touch sensors, altitude sensors, and one or more location circuits/components that can include, for example, a Global Positioning System (GPS) receiver, a triangulation receiver, a tilt sensor, or any other information collecting device that can identify a current location or user-device interface (carry mode) of the electronic device 100. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). For example, in embodiments in which a touch screen display is employed, such a touch screen display can be considered to constitute both a visual output device and a mechanical input device (by contrast, the keys or buttons 108 are mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the electronic device 100 can be supplemented or replaced by other memory portion(s) located elsewhere apart from the electronic device and, in such embodiments, the electronic device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), and informational data. Each operating system includes executable code that controls basic functions of the electronic device 100, such as interaction among the various internal components 200, communication with external devices via the wireless transceivers 202 and/or the component interface 212, and storage and retrieval of programs and data to and from the memory portion 206. As for programs, each program includes executable code that utilizes an operating system to provide more specific functionality, such as file system service and handling of protected and unprotected data stored in the memory portion 206. Such programs can include, among other things, programming for enabling the electronic device 100 to perform processes such as calculating position, movements, acceleration, or metrics based upon information from sensors such as the accelerometer 110, sampling and processing gesture or movement-related information, and performing processes for gesture recognition or recognizing control movements such as processes for recognizing movements intended to actuate or control scrolling operation as described herein. Finally, with respect to informational data, this is non-executable code or information that can be referenced and/or manipulated by an operating system or program for performing functions of the electronic device 100.

Figure 3B:
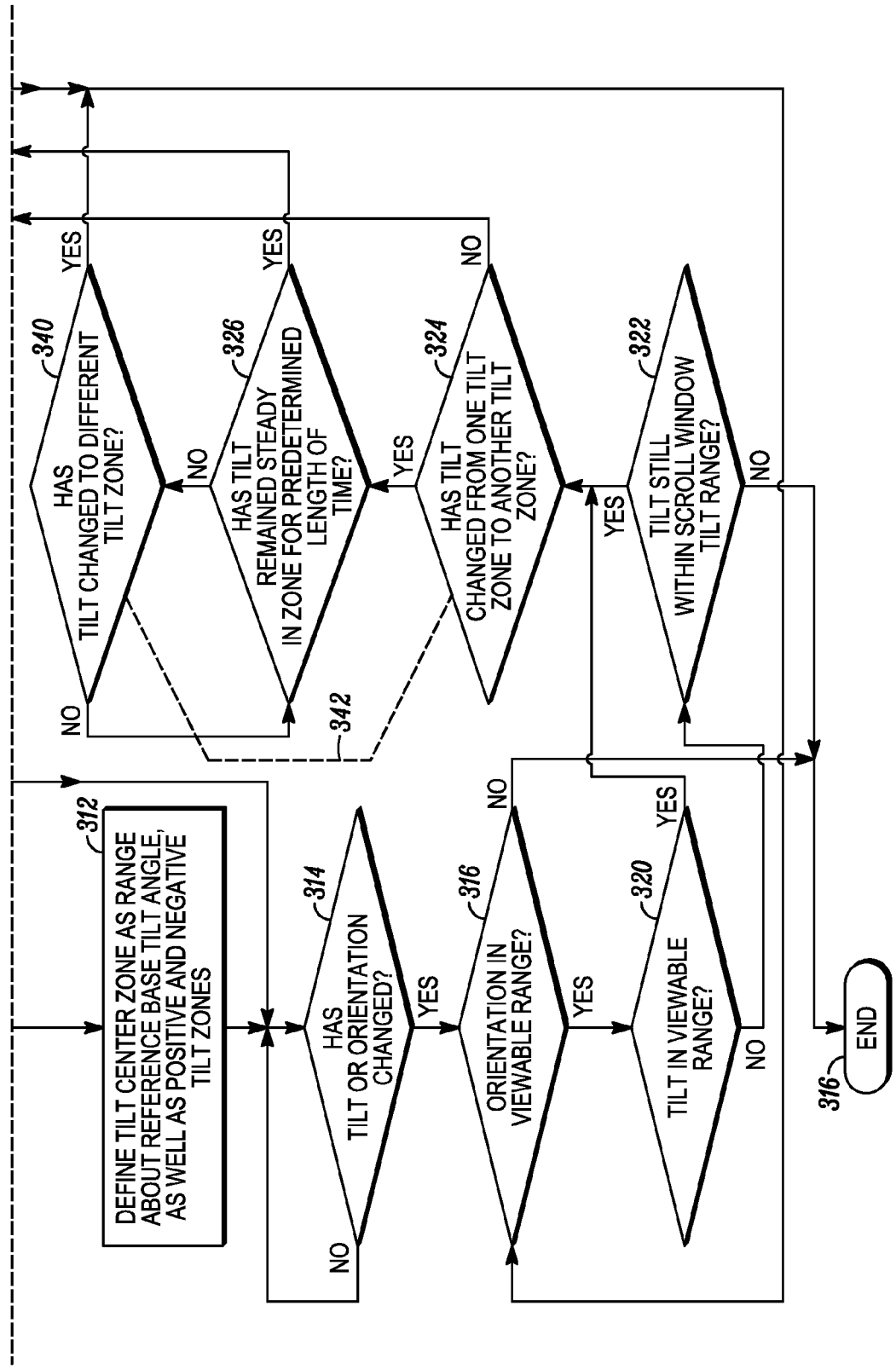
FIG. 3 is a flow chart showing example steps of operation of the electronic device in a scrolling manner.
Figure 4:
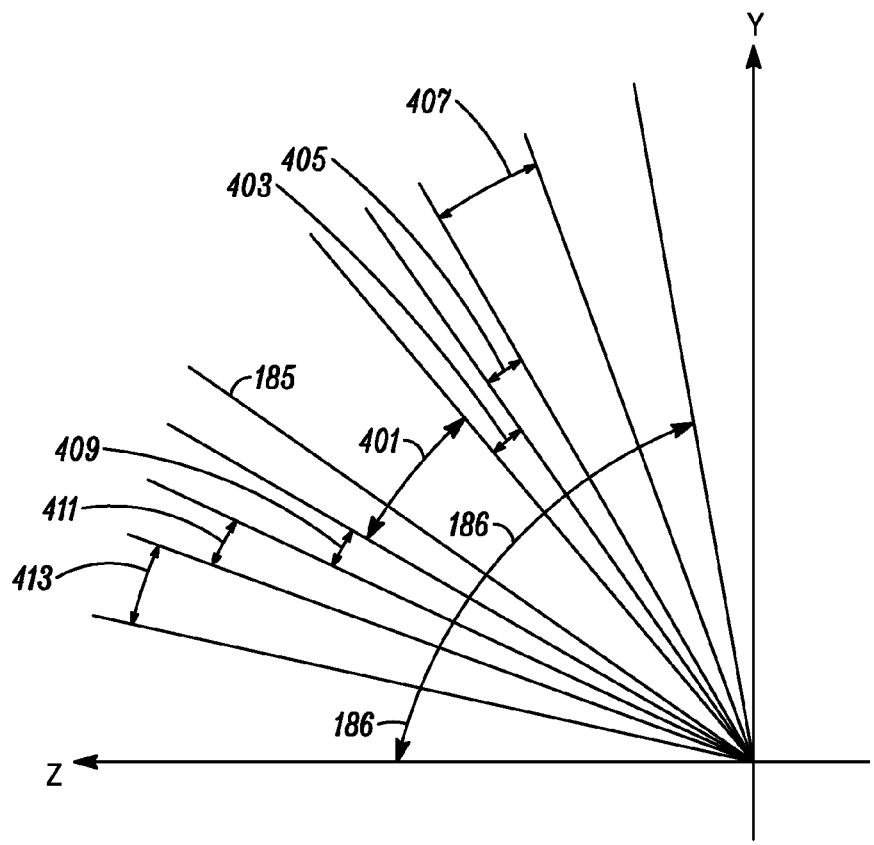
FIG. 4 illustrates various example tilt angles of the electronic device that are of significance to the scrolling manner of operation.

Turning to FIG. 3, a flowchart 300 is provided that shows example steps of operation of the electronic device 100 of FIG. 1 according to which the electronic device operates in a scrolling manner of operation, where the particular manner of operation depends upon the tilt and orientation angles of the electronic device (and display 106 thereof), and particularly the tilt angle, of the electronic device. Aspects of this scrolling operation are further illustrated by FIG. 4, which shows in additional detail various example tilt angles of the electronic device (note that the angles shown in FIG. 4 are not drawn to scale so as to conform to any particular example angle values discussed below), as well as FIG. 5, which illustrates in a figurative manner the scrolling operation.

As shown in FIG. 3, upon beginning at a start step 302, the process commences with the processor 202 calculating (or otherwise determining) the tilt and orientation of the electronic device 100 at a step 304 based upon position information received from the accelerometer 110. Then, at a step 306, it is determined by the processor 204 whether the calculated tilt and orientation angles of the electronic device 100 are both within the viewing range of the electronic device (e.g., such that the display 106 is generally at a location and has an orientation that makes for relatively convenient user viewing, and not in a location or having an orientation inconsistent with viewing, such as if the electronic device was at the user's side). For example, with respect to the tilt angle in particular, the electronic device 100 in the present embodiment can be within the viewing range if the tilt angle is greater than zero degrees but less than 70 degrees, e.g., within the angle range 186 shown in the fifth additional image 182 of FIG. 1 and again shown in FIG. 4. Further for example, with respect to the orientation angle in particular, in the present embodiment the electronic device 100 is within the viewing range if and the electronic device 100 has an orientation angle that is greater than −25 degrees and less than 25 degrees.

So long as the tilt and orientation angles are not both within the viewing range, the process returns to the step 304 and the steps 304 and 306 are performed repeatedly. However, after the tilt and orientation angles are both within the viewing range, the process then advances to a step 308, in which the processor 204 further determines whether both the tilt and orientation angles have remained within the viewing range in a steady manner for a predetermined length of time. In the present embodiment, maintaining steady tilt and orientation angle values at the step 308 is achieved if both the tilt angle value stays within six degrees of separation for 160 milliseconds (ms) and the orientation angle value stays within six degrees of separation for the same 160 ms. If one or both of the tilt or orientation values has not remained within the viewing range in a steady manner for the predetermined length of time, then the process returns from the step 308 to the step 306. However, if the tilt and orientation angles both have remained within the viewing range in a steady manner for the predetermined length of time, then the process instead advances from a step 308 to a step 310, at which the processor 204 causes the tilt angle value of the electronic device 100 that was most recently calculated as of the last performance of the step 304 to be stored as the reference base tilt angle. Although the reference base tilt angle can take on any of a variety of values within the viewing range depending upon the embodiment or operational circumstances, for purposes of example, FIG. 4 shows a reference base tilt angle of +30 degrees that is (or at least corresponds to) the ray 185 shown in the fifth additional image 182 of FIG. 1.

Next, at a further step 312, the processor 204 performs additional computation to define a tilt center zone extending as a range about the reference base tilt angle, as well as defines positive and negative tilt zones relative to the tilt center zone. In the present embodiment, as illustrated by FIG. 4, the tilt center zone (zone zero) is set to be a tilt angle range 401 encompassing the reference base tilt angle (the ray 185) minus three degrees to the reference base tilt angle plus eight degrees. Additionally in the present embodiment, the positive tilt zones are defined as angle ranges having widths of four degrees starting at the positive edge of the tilt center zone 401 (that is, starting at the reference base tilt angle plus eight degree edge) and can be numbered with zone numbers plus one, plus two, plus three, etc., and in this regard FIG. 4 particularly illustrates a first positive zone 403, a second positive zone 405, and a third positive zone 407. Further in the present embodiment, the negative tilt zones are defined as angular ranges each having a width of three degrees starting at the lower edge of the tilt center zone 401 (that is, the reference base tilt angle minus three degrees at the center zone) and can be numbered with zone numbers negative one, negative two, negative three, etc., and in this regard FIG. 4 particularly illustrates a first negative zone 409, a second negative zone 411, and a third negative zone 413.

Notwithstanding the above description, it should be appreciated that the particular numbers of and definitions of ranges of tilt zones can vary depending upon the embodiment. Tables 1 and 2 show additional example values of tilt angle thresholds or boundaries of zones or ranges of zones as well as the number of zones, and Table 1 further particularly lists example units in which such thresholds, zone boundaries, or ranges can be expressed as well as how those values can be determined in any given instance (e.g., if a parameter type is "absolute", the parameter is one that is preset for the electronic device and does not vary depending upon operation, but if a parameter type is "derived" and/or "relative to base" then it is determined based upon some other parameter value).

TABLE 1

Example Tilt Angle Range Boundaries and Tilt Zone Widths Corresponding to Different Tilt Zones Along With Example Associated Units and Parameter Types.

| Parameter Name | Example Value | Unit | Parameter Type |
| --- | --- | --- | --- |
| positive zone width | 4 | deg | absolute |
| negative zone width | 3 | deg | absolute |
| center zone + boundary | 8 | deg | relative to base |
| center zone − boundary | −3 | deg | relative to base |
| number zones | 7 | zone | absolute |
| first zone number | −3 | zone index | derived |
| last zone number | 3 | zone index | derived |
| scroll window tilt min | −12 | deg | derived and relative to base |
| scroll window tilt max | 20 | deg | derived and relative to base |
| scroll window width | 32 | deg | derived |

TABLE 2

Example Tilt Angle Range Boundaries For Different Tilt Zones, for (a) a reference base tilt of zero degrees and (b) a reference base tilt of thirty-five (35) degrees.

| Zone Tilt Boundaries Relative to Base | | | Zone Tilt Boundaries Absolute using Base: 35 | | |
| --- | --- | --- | --- | --- | --- |
| Zone Index | Zone Limits (deg) | | Zone Index | Zone Limits (deg) | |
| | Lower>= | Upper< | | Lower>= | Upper< |
| 3 | 16 | 20 | 3 | 51 | 55 |
| 2 | 12 | 16 | 2 | 47 | 51 |
| 1 | 8 | 12 | 1 | 43 | 47 |
| 0 | −3 | 8 | 0 | 32 | 43 |
| −1 | −6 | −3 | −1 | 29 | 32 |
| −2 | −9 | −6 | −2 | 26 | 29 |
| −3 | −12 | −9 | −3 | 23 | 26 |

After the tilt center zone and the positive and negative tilt zones have been defined at the step 312, then scrolling operation can commence in earnest. In this regard, the process advances from the step 312 to a step 314, at which the processor 204 determines whether the tilt or orientation angle values have changed at all. If no change has taken place, then the process remains at the step 314 (and in this circumstance, because scrolling operation has just begun and the electronic device is at its reference base tilt angle, no scrolling is occurring). Alternatively, if at the step 314 it is determined that the tilt or orientation angle values have changed at least in some respect, then the process advances to a step 316, at which the processing device further determines whether the orientation is in the viewable range. If the orientation is changed such that it is no longer even within the viewable range (that is, within the viewable range as discussed with reference to steps 306 and 308), then the process immediately ends at step 318. Upon reaching the step 318, the method can be restarted at the start step 302, or the method can be completely exited.

However, if the orientation is still within the viewable range, then the process instead advances to a step 320, at which the processor 204 further determines whether the tilt angle is in the viewable range (for example, whether the tilt angle is within the angle range 186 of FIG. 4). If the tilt angle is no longer within the viewable range, then the processor 204 advances from the step 320 to a step 322, at which the processor further determines whether the tilt is still within a scrolling window tilt range of the electronic device 100, e.g., between the scroll window tilt min and max (although FIG. 4 does not illustrate an example scrolling window tilt range, in one example embodiment the scrolling window tilt range could be larger in range than the angle range 186 shown in FIG. 4). If that is not the case, then the process again advances to the end step 318. However, if at the step 320 it is determined that the tilt angle is still within the viewable range, or if at the step 322 it is determined that the tilt angle is still within the scroll window tilt range, then in either case the process advances from the step 320 or step 322 as may be the case to a step 324.

Next, at the step 324, the processor 204 further determines, based upon additional input signal information from the accelerometer 110, whether the tilt angle of the electronic device 100 has changed sufficiently so that the tilt angle has changed from being within one tilt zone to being within another tilt zone. If the tilt angle has changed from being within one tilt zone to being within another tilt zone (e.g., between the tilt center zone 401 and one of the positive tilt zones 403, 405, and 407 or one of the negative tilt zones 409, 411, or 413, or between any two of those positive and/or negative tilt zones shown in FIG. 4), then a scrolling gesture potentially has occurred and correspondingly, a change in the current manner of scrolling operation is potentially appropriate. Before it is determined that a scrolling gesture has actually occurred and that a change in the scrolling manner of operation is appropriate, however, at a step 326 the processor 204 further determines whether the tilt angle has remained steady in the current (new) zone for a predetermined length of time. As with the determination of whether the tilt angle remained steady in the step 308, the determination of steady tilt at the step 326 can be determined based upon whether the tilt angle has stayed within six degrees of separation (and within the current, new, tilt zone) for 160 milliseconds.

If upon the performing of the step 326 it is determined that the tilt angle not only has changed zones but also is now steady in the new zone, a scroll gesture is determined to have occurred and that scroll gesture is assigned a scroll gesture value $g_v$, and then the process advances to a step 328, at which a target scrolling velocity is set corresponding to the scroll gesture value. In the present embodiment, the scroll gesture value $g_v$ is set to be the number of the tilt zone that the tilt angle has entered, and thus the target scrolling velocity is determined based upon (e.g., as a function of) the number of the zone that the tilt angle has entered, although in other embodiments the scroll gesture value and/or target scrolling velocity can be determined based upon other factors instead of or in addition to the number of the zone that the tilt angle has entered. Further for example, in the present embodiment, supposing that the tilt angle has changed from being at the reference base tilt angle to being within the second positive zone 405, the target scrolling velocity could be changed from zero to a second scrolling speed level that is faster than a first scrolling speed level that might be associated with a transition to the first positive zone 403.

Figure 5:
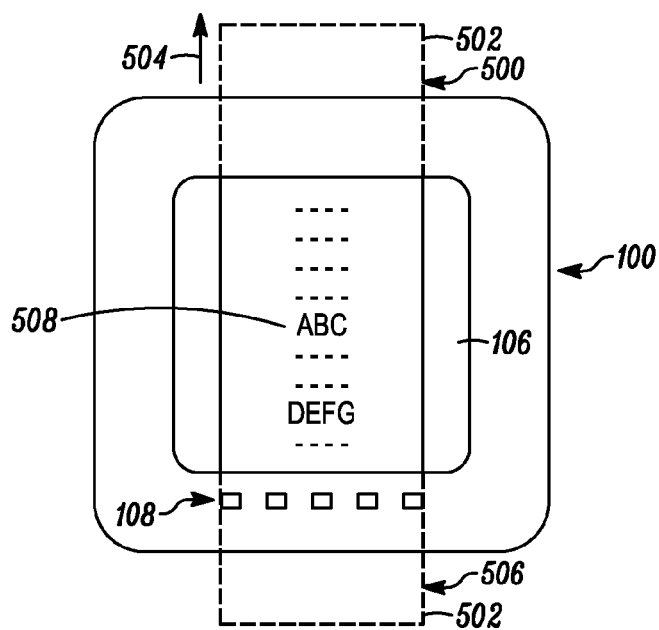
FIG. 5 illustrates in a figurative manner the scrolling operation of the electronic device of FIG. 1.

It should be appreciated that the direction of the scrolling also will typically correspond to the tilt zone that has been entered. For example, suppose that as shown in FIG. 5 there is a message 500 that is being displayed by the display 106 of the electronic device 100 and, as represented by the dashed lines 502 extending above and beneath the display 106, the message 500 has a length that is sufficiently long that the entire document cannot be viewed all at the same time but can be viewed in its entirety if scrolling operation is performed. Then, in the present embodiment, if the tilt angle is changed from the reference base tilt angle to being within the second positive zone 405, this scrolling gesture can be interpreted as a command by the user that the message 500 should be scrolled upwards in the direction of an arrow 504 so that progressively lower portions such as a bottom portion 506 of the document 500 become visible and a middle region 508 of the document moves off of the display 106. Such operation can colloquially be referred to as "scrolling-down" notwithstanding the direction of the arrow 504, because the user is trying to view progressively lower portions of the document. Alternatively for example, if the tilt angle was changed from the reference base tilt angle to being within one of the negative tilt zones 409, 411, and 413, this scrolling gesture can be interpreted as a command by the user that the document 500 should be scrolled in a direction opposite to that of the arrow 504 such that progressively higher portions of the document become visible on the display 106 (such operation can colloquially be referred to as "scrolling-up" because the user is trying to view progressively higher portions of the document).

Further referring to FIG. 3, in the present embodiment, a change in the actual scrolling velocity (that is, the scrolling shown on the display 106) to a new target scrolling velocity set in the step 328 does not occur instantaneously, but rather the change occurs gradually. Thus, upon resetting the target scrolling velocity at the step 328, at a step 330 the processor 204 considers whether scrolling is currently occurring at the target scrolling velocity. If the scrolling is not yet occurring at the target scrolling velocity, then the process advances to a step 332, at which scrolling operation is modified so as to ramp up the scrolling velocity toward the target scrolling velocity and then the process advances to a step 334. Alternatively, if the scrolling is currently occurring at the target scrolling velocity as determined at the step 330, then scrolling at that target scrolling velocity is then performed at a step 336, after which the process again proceeds to the step 334.

Upon reaching the step 334, the processor 204 considers further whether, based upon additional signal information from the accelerometer 110, whether the tilt or orientation angles of the electronic device 100 have changed significantly. The extent of changed required in order for a given change to be significant in this regard can depend upon the embodiment (and the extent can be different with respect to tilt angle and orientation angle). Nevertheless, in the present embodiment, it can be assumed that a change in tilt angle or orientation angle is determined to be significant if the change exceeds the range of tolerance that is utilized in determining whether the tilt has remained steady in the step 326 (e.g., six degrees of separation). In an alternate embodiment, any change at all is deemed significant. Regardless of the particular tolerance range(s) or threshold(s) that are employed, if it is determined that neither the tilt angle nor the orientation angle has changed significantly at the step 334, then the process returns to the step 330 and the steps 330 and 332 or 336 (as applicable) and 334 are then repeated and this can continue on indefinitely until a top or bottom limit of the image, message, document, or web page is achieved. Alternatively if at the step 334 the processor 204 determines that the tilt or orientation angles have changed significantly, then the process returns to the step 316 as indicated in FIG. 3.

In addition to the above-discussed operations, it should be further noted that the flow chart 300 of FIG. 3 includes several additional steps that may govern scrolling operation in particular circumstances. First, in addition to the above-described steps of operation, the flow chart 300 additionally includes a step 338 that is reached if, at the step 324, it is determined that the tilt angle has not changed from one tilt zone to another tilt zone. If this is the case, then at the step 338 it is further determined whether the scrolling operation (e.g., active scrolling of the document) is going on. If so, the process advances to the step 330 but, if not, the process instead returns from the step 338 back to the step 314. Further, the flow chart 300 of FIG. 3 also includes a step 340, which is reached if, at the step 326, it is determined that the tilt angle has not (or not yet) remained steady for the predetermined length of time in the new zone to which the tilt angle transitioned as determined at the step 324. Upon reaching the step 340, the processor 204 additionally determines whether the tilt angle has changed to a different tilt zone and, if not, the process returns to the step 326 to further consider whether the tilt angle has remained steady for the predetermined length of time and, if so, the process proceeds from the step 340 also back to the step 316.

In view of operations discussed in regard to FIG. 3, it should be appreciated that, upon the tilt angle changing to a new zone and being steady within that zone, the electronic device 100 displays an image (e.g., the message 500 of FIG.

5) in a scrolling manner according to which the scrolling velocity of the document increases or decreases gradually to attain the target scrolling velocity and, upon reaching that target scrolling velocity, continues to scroll at that target scrolling velocity indefinitely until the tilt or orientation angles of the electronic device changes significantly or a limit of the image is reached. Further, it should be appreciated that, even if one or both of the tilt angle or orientation angle do change significantly as determined at the step 334, by virtue of the steps 316, 320, 322, 324, and 338, scrolling display at the target velocity continues to occur (or continues to ramp up or down toward the target velocity) so long as the change in the orientation angle is not so large that the orientation angle is no longer within the viewable range, and so long as the change in the tilt angle is not so large as to change the tilt zone within which the tilt angle resides.

Further, as represented by a dashed line 342 linking the steps 324 and 340 of FIG. 3, it should be appreciated that, if a determination is made at the step 340 that the tilt angle has changed to be in a different tilt zone than the tilt zone to which the tilt angle had previously changed (such that the process had previously advanced from the step 324 to the step 326 and ultimately then to the step 340), then when the process again reaches the step 324 the determination made in step 324 at the time should be understood to be the same determination as was made during the performing of the step 340—namely, that the tilt zone did indeed change to a new tilt zone. For example, if the processor 204 initially determines at the step 324 that the tilt angle has changed from being within the tilt center zone to being within the first positive tilt zone, and the processor 204 subsequently at the step 326 determines that the tilt angle has not yet remained steady and consequently the process advances to the step 340, and if further at the step 340 it is determined that the tilt angle has changed from being within the first positive tilt zone to being within the second positive tilt zone (but otherwise the orientation angle has not changed), then upon returning to the step 324 the process proceeds directly to the step 326 because the determination made in the step 324 is that the tilt angle has changed from being within the first positive tilt zone to being within the second positive tilt zone. It should also be appreciated that, notwithstanding that FIG. 3 shows the start and end steps 302 and 318, the process represented by the flow chart 300 can repeat indefinitely, with the end step 318 being immediately followed by the start step 302.

Although not shown in FIG. 3, it should be appreciated that in at least some embodiments scrolling operation of the electronic device is superseded in importance by other operations, and particularly superseded when other gestures or touch inputs or commands are detected by the electronic device. For example, notwithstanding the flow chart 300 of FIG. 3, in some such embodiments, at the beginning of (or upon the occurrence of) any touch event at the electronic device, the current velocity for scrolling is immediately set to zero (0) and the flow chart 300 would go to the end step 318. Subsequently, at the end of any touch event, the flow chart 300 would start again at start step 302. Such operation is appropriate so that tilt-based scrolling does not interfere with touch gestures. In embodiments operating this manner, any touch can essentially be used to stop scrolling and to reset the base tilt position. Further, in at least some such embodiments, it is possible to utilize such touch activity to define the scroll window around a position that is in a secondary (and larger) viewable range than a primary viewable range.

Additionally, although not evident from FIG. 3, it also should be appreciated from FIG. 5 that a typical image document such as the message 500 is not limitless in length and accordingly that scrolling operation at a given velocity will typically, ultimately, result in an uppermost or lower most section of the document being displayed on the display 106. Given this to be the case (as well as possibly other considerations), in at least some embodiments the processor 204 operates to track, use, and update animation metrics to provide a desired manner of display that can take into account such display issues. More particularly, in at least some such embodiments, during displaying of the image (e.g., an image of a message such as the message 500), the processor 204 calculates and tracks the last position of the image (or message), $d_n$, the last velocity of the image (or message), $v_n$, as well as the acceleration of the image (or message) on the display, where the acceleration a particularly will be zero or of constant magnitude when there is ramping up or down or the scrolling velocity in accordance with the step 332 and can be defined by the following equation:

$$a \in \{-a_0, 0, +a_0\} \quad (4)$$

Additionally, in such embodiments, when a scroll gesture is determined to have occurred at the step 326, the gesture value $g_v$ is used to set a target velocity $v_T$ and a target position $d_T$. The a target velocity $v_T$ particularly can be calculated by the following formula, where k is a constant:

$$v_T = k \cdot g_v \quad (5)$$

Further, the target position $d_T$ is typically set to correspond to either the top or bottom of the content (e.g., the top or bottom of the message 500 in FIG. 5), and the acceleration is set so that the current velocity will ramp up or down toward the target velocity. Based upon these parameters, new animation metrics are calculated according to the following equations until targets are reached, where in the following equations t is the time that has passed since the last update, a represents acceleration, $v_{n+1}$ is the updated velocity based upon the acceleration a and time t, and $d_{n+1}$ is the updated position based upon the acceleration a, time t, updated velocity $v_{n+j}$, and last position $d_n$:

$$a = a_0 \cdot \text{sign}(d_T - d_n) \quad (6)$$

$$v_{n+1} = at + v_n \quad (7)$$

$$d_{n+1} = \frac{1}{2}at^2 + v_{n+1}t + d_n \quad (8)$$

Additionally, during scrolling operation (e.g., as performed particularly by way of the steps 330, 332, 336, 334, 324, and 338 of FIG. 3 and assuming that the steps 316, 320, and 322 do not end the scrolling operation), if the target velocity $v_T$ is reached before the target position $d_T$ is reached, the animation metrics are updated in accordance with the following additional equations:

$$a = 0 \quad (9)$$

$$v_{n+1} = v_T \quad (10)$$

$$d_{n+1} = v_T t + d_n \quad (11)$$

Further, once the target position $d_T$ has been reached, the animation metrics are updated in accordance with the following additional equations:

$$a = 0 \quad (12)$$

$$v_{n+1} = 0 \quad (13)$$

$$d_{n+1} = d_T \quad (14)$$

In view of the above discussion, it should be appreciated that actual movement of the displayed image (e.g., movement of the message 500 of FIG. 5) on the display 106, notwithstanding scrolling operation of the electronic device 100 in accordance with FIG. 3, will cease when the uppermost or lowermost portions of the image are reached. At such time, it still can be the case that the target velocity $v_T$ will be as most recently determined at the step 328 (e.g., nonzero) until such time as one or both of the tilt or orientation angles change sufficiently that the process ends at the end step 318 or the tilt angle changes to being within a different tilt zone at the step 324, at which point upon a determination that the tilt angle is steady at the step 326, the target scrolling velocity can again be reset. Correspondingly, although not illustrated in FIG. 3, such operation could be reflected in the flow chart 300 if, at the step 330, it is additionally determined whether the target position $d_T$ has been reached and, if so, then the process would advance immediately from the step 330 to the step 334 rather than to either of the steps 332 or 336.

Although the above description pertaining to FIG. 3 presents a particular embodiment in which changes in the tilt angle from one tilt zone to a different tilt zone are determined to be steady based upon whether the tilt angle remains in that particular different tilt zone for a predetermined length of time, the present disclosure is intended to encompass other embodiments in which the steadiness determination is made in a different manner or based upon other criteria. For example, referring to FIG. 6, in one example alternate embodiment, a step 626 is substituted for the step 326 in FIG. 3 so as to arrive at a modified process consistent with the flow chart 300 but employing the step 626 in place of the step 326. In this regard, the step 626 is intended to accommodate the possibility that, even though an operator may in some circumstances vary the tilt angle in an effort to cause a change in scrolling operation, the operator may not always change the tilt angle to a different tilt zone and keep the tilt angle within that tilt zone consistently but rather potentially may change the tilt angle to a different tilt zone but then oscillate between that different tilt zone and other different tilt zone(s) (at least for a period of time before settling upon the different tilt zone). The embodiment represented by FIG. 6 is designed to recognize that such operational behavior, at least under some circumstances, still can be interpreted as a command to change the scrolling velocity notwithstanding the occurrence of oscillatory inputs from the operator.

Figure 6:
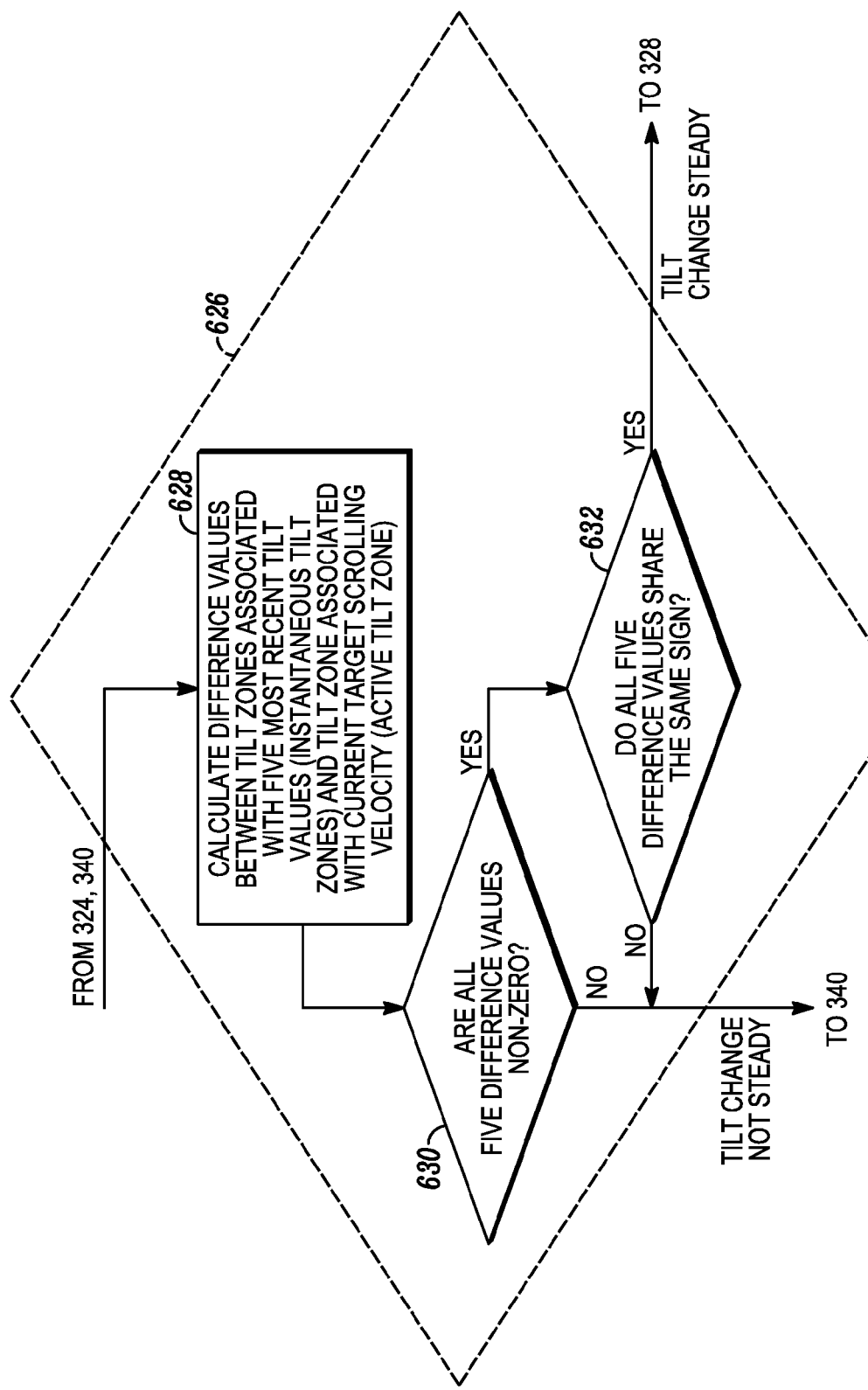
FIG. 6 is a portion of a flow chart showing an alternate embodiment of a portion of the flow chart of FIG. 3.

More particularly as shown in FIG. 6, the step 626 includes a first substep 628, a second substep 630, and a third substep 632. At the first substep 628, the processor 204 calculates respective differences between each of the tilt zones associated with a set of most recent detected tilt angle values (for example, as indicated, the five most recent detected tilt angle values), which can be referred to as the instantaneous tilt zones, and the tilt zone that is associated with the current target scrolling velocity, which can be referred to as the active (or current) tilt zone. Subsequently, at the second substep 630, the processor 204 then further determines whether all of the calculated difference values (e.g., all of the five calculated difference values) are nonzero. If all of the calculated difference values are nonzero, then the process advances to the third substep 632, at which the processor additionally determines whether all of the calculated difference values share the same sign (e.g., are all of the difference values positive or all of the difference values negative).

If it is the case that one or more of the collection of difference values calculated at the step 628 is or are zero as determined at the second substep 630 or those difference values do not all share the same sign as determined at the third substep 632, then in either case this is indicative that the change in tilt angle is not steady and consequently the process advances from the step 626 to the step 340, at which time a new tilt angle value is detected or sampled. Consistent with the step 340 as shown in FIG. 3, if the newly-detected tilt angle value indicates that the tilt angle has not shifted to a different tilt zone, then the process returns to the step 626 for further consideration of whether the tilt angle is steady based upon the newest collection of difference values—that is, the collection of difference values in which the oldest of the previously-considered collection has been eliminated and that includes a new difference value calculated based upon the most recently-sampled tilt angle determined at the step 340. Also consistent with the step 340 as shown in FIG. 3, if the newly-detected tilt angle value detected at the step 340 indicates that the tilt angle has changed to a different tilt zone, then the process proceeds as indicated through the steps 316, 320, 322, and 324 and (as already discussed above, in accordance with the dashed line 342) can return to reperform the step 626 based upon the most recent tilt angle value determined at the step 340

Alternatively, further with respect to the step 626, if it is the case that all of the difference values calculated at the first substep 628 are nonzero as determined at the second substep 630 and additionally that all of the difference values share the same sign as determined at the third substep 632, then this is indicative that the change in the tilt angle is steady and the process advances from the step 626 to the step 328 at which the target scrolling velocity is set. More particularly, in the present embodiment, when all of the difference values are nonzero and share the same sign, then the target scrolling velocity (and correspondingly any acceleration allowing for ramping up or down to that velocity) is set to a level corresponding to a new active tilt zone, where the active tilt zone differs from the previously active tilt zone by the minimum of the absolute value of the collection of difference values (subject to any minimum and/or maximum zone indices) calculated at the step 628, and where the change in the active tilt zone from the previously active tilt zone is in the direction given by the sign of the collection of difference values (where, again, the sign of all of the difference values is the same).

Further in regard to the embodiment corresponding to the flow chart 300 modified to employ the step 626 of FIG. 6 in place of the step 326 of FIG. 3, Table 3 provides example data illustrating how, in one operational instance, steadiness determinations can be made based upon changing tilt angle values. More particularly in this example, a first row labeled "ITZ" constitutes a sequence of instantaneous tilt zone values corresponding to a sequence of tilt angle values detected periodically at successive times (typically though not necessarily with a constant periodicity), particularly at the steps 324/340 of FIG. 3 (interrelated as represented by the dashed line 342 as discussed above). Additionally, second row labeled "ATZ" constitutes a sequence of active tilt zone values corresponding to the target scrolling velocity, which will vary depending upon the determinations made at the step 626 as to whether the tilt angle has remained steady. Finally, the third row labeled "Chg." (Change) illustrates the times at which the active tilt zone value and correspondingly the target scrolling velocity is modified based upon a determination that the tilt angle has remained steady.

TABLE 3

Example Active Tilt Zone Variation With Varying Instantaneous Tilt Zone.

| ITZ | 0 | −1 | −1 | −2 | −2 | −3 | −2 | −3 | −2 | −1 | 1 | 2 | 3 | 2 | 3 | 3 | 3 | 3 | 3 |
|---|---|---|---|---|---|---|---|---|---|---|---|---|---|---|---|---|---|---|---|
| ATZ | 0 | 0 | 0 | 0 | 0 | −1 | −1 | −2 | −2 | −2 | −2 | −2 | −2 | −1 | 1 | 2 | 2 | 2 | 3 |
| Chg. | | | | | | ^ | | ^ | | | | | | ^ | ^ | ^ | | | ^ |

In considering Table 3, it should be appreciated that, in the present example embodiment, five difference values corresponding to each of the five most recent instantaneous tilt angle values are calculated at the first substep 628 each time that the step 626 is performed. However, in other embodiments, the number of difference values that are calculated (and the number of instantaneous tilt angle values that are utilized for such calculations) can vary, for example, to numbers less than five or greater than five, as can the periodicity with which sampling of the tilt angle values is performed. Given that, with respect to the example of Table 3, each performing of the calculations at the first substep 628 involves the calculating of five difference values, Table 3 then can be understood to illustrate an operational sequence in which six changes occur in the active tilt zone (and correspondingly with respect to the target scrolling velocity), at times 6, 8, 14, 15, 16, and 19 shown with carats in the third row of the table More particularly the change at the time 6, from an original active tilt zone value of zero (e.g., the tilt center zone encompassing the base tilt angle as discussed above) to an active tilt zone value of negative one, occurs because each of the most recent instantaneous tilt zones at and preceding that time is less than zero, and because the instantaneous tilt zone value that is closest to the original active tilt zone value has a value of negative one (that is, even though the instantaneous tilt zone values at the times 4, 5, and 6 have values of negative two or negative three, these values are not closest to the original active tilt zone value of zero).

Additionally, with respect to the change at the time 8, at which the active tilt zone value is further changed from negative one to negative two, this change occurs because the most recent five instantaneous tilt zone values each are less than the negative one active tilt zone value (as set at the time 6), and because the instantaneous tilt zone value that is closest to that negative one value has a value of negative two. Subsequently, with respect to the change at the time 14, at which the active tilt zone value is changed back from negative two to negative one, this change occurs because the most recent five instantaneous tilt zone values each are greater than the negative two active tilt zone value (as set at the time 8), and because the instantaneous tilt zone value that is closest to that negative two value has a value of negative one. Similarly, at the time 15, the active tilt zone value is adjusted further to positive one, because the most recent five instantaneous tilt zone values each are greater than the negative one active tilt zone value (as set at the time 14), and because the instantaneous tilt zone value that is closest to that negative one value has a value of positive one, and at the time 16, the active tilt zone value is adjusted further to positive two, because the most recent five instantaneous tilt zone values each are greater than the positive one active tilt zone value (as set at the time 15), and because the instantaneous tilt zone value that is closest to that positive one value has a value of positive two. Finally, at the time 19, the active tilt zone value is adjusted further to positive three, because the most recent five instantaneous tilt zone values each are greater than the positive two active tilt zone value (as set at the time 16), and because the instantaneous tilt zone value that is closest to that positive two value has a value of positive three.

It should be appreciated that manner of operation represented by the flow chart 300 modified to employ the step 626 of FIG. 6 differs from the manner of operation represented by the flow chart 300 of FIG. 3 particularly in that the determination of whether a change in tilt angle is deemed sufficiently steady to warrant a change in the active tilt zone (and corresponding change in the target scrolling velocity) depends not upon whether the tilt angle to which the electronic device 100 has been moved remains constant or substantially constant, but rather upon whether the tilt angle of the electronic device is steadily away from the most-recently determined (that is, the original, or previously-determined) active tilt zone. Achieving such operation involves a form of hysteresis control, in that the processor 204 takes into account multiple tilt angle values (and corresponding instantaneous tilt zone values) sampled sequentially over time so as allow for a determination as to whether the tilt angle behavior overall, notwithstanding some temporal variation, justifies a conclusion that the tilt angle has been steadily away from the most-recently determined active tilt zone. Even so, it is evident from Table 3 (e.g., as illustrated particularly at the times 14, 15, and 16) that, despite taking into account past tilt angle values, variations in the active tilt zone can occur rapidly as tilt angle values vary.

Notwithstanding the above description of certain embodiments, the present disclosure is intended to encompass numerous other embodiments of electronic devices and methods of operating electronic devices in which movement of the electronic device, and particularly rotation of the electronic device about one or more rotational axes by a user, can be used to control the operation of a display device of the electronic device to perform scrolling operation or similar types of image display operations. For example, although the above-described embodiments particularly envisions control of scrolling operation based upon variations in tilt angle (e.g., rotation about the x-axis as shown in FIG. 1), with orientation angle (e.g., rotation about the z-axis as shown in FIG. 1) to some extent also influencing such operation, in other embodiments rotations about the y-axis can also be utilized to control or influence scrolling operation (e.g., to the left or right). In at least some such embodiments, the accelerometer 110 and/or another motion-sensing device such as a gyro (and/or another device that determines angular velocity around the three axes) can be utilized to sense all such rotational movements to allow for such operation.

At the same time, it should further be noted that it is natural to view the electronic device 100 (or another electronic device) as having an x-axis that is horizontal or nearly horizontal throughout the viewable region (e.g., deviating only by the orientation), such that tilt is a natural metric to use for controlling vertical scrolling By comparison, use of rotation about the y-axis is not as direct. For example, in the tilt=0 case, the accelerometer 110 gives no information about rotation around the y-axis, and it is only with a tilt of 90 degrees that both the x and y axes are horizontal. If the tilt is high enough, some calculation and tracking can be performed to consider changes around the y-axis, but consideration of rotation about the y-axis alone or in addition to rotation about the x-axis can ultimately, in at least some circumstances, provide less of a consistent user experience than is afforded when rotation about the x-axis is alone considered.

Additionally, although the above-described embodiments particularly relate to the control of scrolling operation on an electronic device based upon movements of the electronic device, the present disclosure also is intended to encompass embodiments in which other functionality of electronic devices is controlled in identical or similar manners. For example, in some alternate embodiments, rotational movements of the electronic device 100 and particularly changes in the tilt angle thereof can be employed to control any of graphics display characteristics (e.g., on the display 106), microphone sensitivity, or volume of audio output on the device.

Further for example, in the case of a volume control application, operation colloquially referred to above as "scrolling-up" would cause lowering of the volume and operation colloquially referred to above as "scrolling down" cause raising of the volume. Additionally, a changing of the tilt angle to being within the top (highest positive) tilt zone could cause bringing up of a control mechanism. Also, if the tilt angle remained in the top zone, the control mechanism would recognize this as a command that the audio application should be ended (exited), and if the tilt angle receded into any lower tilt zone, the control mechanism would be cancelled. Such control associated with the top tilt zone could provide a consistent experience for a user across multiple applications, because with such a manner of control a user would not have to turn the audio all the way down before exiting (similarly, in regard to scrolling operation involving scrolling of a document as described above, a user in at least some embodiments would not have to scroll all the way down before exiting the application involving reading).

Additionally, in at least some such embodiments, in addition to changes in tilt angle (rotation about the x-axis) serving to control volume as well as exiting an audio application, changes in orientation angle (rotation about the z-axis) or other rotational movements (e.g., rotation about the y-axis) can be employed to control other functions such as fast forward or rewind functions. Thus, in at least some such embodiments, the control afforded by rotation of the electronic device can concern not only the audio quality but also other operations commonly associated with an audio recording or output device.

In still additional alternate embodiments, rotational movements of an electronic device such as those discussed above in relation to scrolling operation can be used with an application that displays web browsing information, or short messages or tweets (e.g., as provided by a service offered by Twitter Inc. of San Francisco, Calif.). For example, in the case of tweets, such rotational movements can control for the tweets being "refreshed". In some such embodiments, the operation allows for returning to earlier in flow, returning to the top of flow, and exiting flow. The mechanism to refresh can in at least some such embodiments be merely when the position gets close to the end of the content (that is, perhaps refreshing need not be associated with control), and then the top tilt zone as described above can be used to control a refresh. Also, in some such embodiments, detection by the electronic device of a scroll gesture that is indicative of a command to scroll past the top of the content would be interpreted as a command to refresh and obtain new content for the electronic device, where the new content particularly would include newer tweets than were previously stored on the electronic device. By contrast, also in such embodiments, detection by the electronic device of a scroll gesture that is indicative of a command to scroll past the bottom of the content would be interpreted as a command to refresh and obtain new content for the electronic device including older tweets than were previously stored on the electronic device.

Further, in yet an additional alternate embodiment, rotational movements of an electronic device such as those discussed above in relation to scrolling operation can be used with an application such a contact list. In such an embodiment, scrolling of the listing of contacts and associated information can again be performed in substantially the same manner as described in regard to FIGS. 1 to 5 but also, depending upon tilt angle changes (e.g., movement of the tilt angle to be within the top tilt zone) or other movements, a user can provide commands to take other actions such as dialing a telephone number or exiting flow.

From the above description it should be appreciated that at least some embodiments of the present disclosure are advantageous in one or more respects. Among other things, at least some embodiments of the present disclosure allow for a user to control the displaying of information in a scrolling manner on an electronic device without physically touching the electronic device by way of the user's finger to provide the command, which can be advantageous in the case of a wristwatch (e.g., where the fingers of one of the user's hands cannot touch the wristwatch) or in the case of a smart phone, particularly in the case where a user is holding the phone with one hand but does not wish to touch it with the user's other hand. Indeed, allowing for commands to be provided to an electronic device by way of rotating the electronic device about one or more axes can facilitate the providing of many different commands that might otherwise be difficult or inconvenient to achieve through the use of other forms of gestures or other forms of input.

Thus, it is specifically intended that the present disclosure not be limited to the embodiments and illustrations contained herein, but include modified forms of those embodiments including portions of the embodiments and combinations of elements of different embodiments as come within the scope of the following claims.

What is claimed is:
1. A method comprising:
receiving, by a processor of an electronic device, from a position or movement sensor of the electronic device, at least one position signal;
determining, by the processor of the electronic device, based on the at least one position signal, a first tilt position of the electronic device;
responsive to determining that the first tilt position has remained steady at a viewable angle for at least a predetermined amount of time:
  storing, by the processor of the electronic device, to a memory of the electronic device, the first tilt position of the electronic device;
  defining, by the processor of the electronic device, a plurality of tilt zones that are in relation to the first tilt position, the plurality of tilt zones including a first tilt zone that includes the first tilt position;
  determining, by the processor of the electronic device, based on the at least one position signal, a second tilt position of the electronic device; and
  responsive to determining that the second tilt position of the electronic device is included in a second tilt zone of the plurality of tilt zones, outputting, for display by a display of the electronic device, scrolling information, wherein the scrolling information is determined based at least in part on the second tilt zone; and responsive to determining that the first tilt position has not remained steady at the viewable angle for at least the predetermined amount of time:
    determining, by the processor of the electronic device, based on the at least one position signal, a third tilt position of the electronic device; and
    responsive to determining that the third tilt position has remained steady at any viewable angle for at least the predetermined amount of time, defining, by the processor of the electronic device, the plurality of tilt zones in relation to the third tilt position.

2. The method of claim 1, wherein displaying the scrolling information includes increasing or decreasing a scrolling velocity associated with the scrolling information to a target velocity corresponding to the second tilt zone.

3. The method of claim 2, further comprising: after the scrolling velocity attains the target velocity, displaying, at the display of the electronic device, the scrolling information at the target velocity.

4. The method of claim 3, further comprising:
responsive to determining that a fourth tilt position of the electronic device is included in the third tilt zone, increasing or decreasing the scrolling velocity to a second target velocity corresponding to a third tilt zone.

5. The method of claim 1, wherein the scrolling information includes at least one of text, a series of messages, contacts information, web browsing information, or imagery, and the position or movement sensor is at least one of a gravity sensor, an accelerometer, and a gyroscope.

6. The method of claim 1, further comprising:
responsive to determining that, while displayed, at least a portion of the scrolling information includes an uppermost or lowermost portion of the information, ceasing displaying, at the display of the electronic device, the scrolling information.

7. An electronic device comprising:
a display component that includes a display surface having a variable tilt position;
a position sensing component configured to provide at least one position signal indicative of the variable tilt position of the display surface; and
a processor configured to:
    receive the at least one position signal;
    determine, based on the at least one position signal, a first tilt position of the display surface;
    responsive to determining that the first tilt position has remained steady at a viewable angle for a predetermined amount of time:
        define a plurality of tilt zones that are in relation to the first tilt position, the plurality of tilt zones including a first tilt zone containing the first tilt position;
        determine, based on the at least one position signal, a second tilt position of the display surface; and
        responsive to determining that the second tilt position is included in a second tilt zone of the plurality of tilt zones, cause the display component to display scrolling information, wherein the scrolling information is determined based at least in part on the second tilt zone; and
    responsive to determining that the first tilt position has not remained steady at the viewable angle for at least the predetermined amount of time:
        determine, based on the at least one position signal, a third tilt position of the electronic device; and
        responsive to determining that the third tilt position has remained steady at any viewable angle for at least the predetermined amount of time, define the plurality of tilt zones in relation to the third tilt position.

8. The electronic device of claim 7, wherein the electronic device is a wristwatch device, a smart phone, or a tablet computer.

9. The electronic device of claim 8, wherein the position sensing component includes one or more of an accelerometer, a gyroscope, and a gravity sensor.

10. The electronic device of claim 9, further comprising a memory component configured to store the first tilt zone from which the plurality of tilt zones are defined.

11. The method of claim 1, further comprising:
while displaying the scrolling information, detecting, by the processor of the electronic device, a user touch input; and
responsive to detecting the user touch input, ceasing displaying, at the display of the electronic device, the scrolling information.

12. The method of claim 11, wherein the viewable angle is a first viewable angle, the plurality of tilt zones are a first plurality of tilt zones, and the scrolling information is first scrolling information, the method further comprising:
after ceasing displaying the scrolling information i, determining, by the processor of the electronic device, that the second tilt position corresponds to a second viewable angle;
responsive to determining that the second tilt position corresponds to a second viewable angle and that the second tilt position has remained steady for the predetermined amount of time, storing, by the processor of the electronic device, at the memory device of the electronic device, the second tilt position of the electronic device;
defining, by the processor of the electronic device, a second plurality of tilt zones that are in relation to the second tilt position, the second plurality of tilt zones including the second tilt zone containing the second tilt position;
determining, by the processor of the electronic device, based on the at least one position signal, a fourth tilt position of the electronic device; and
responsive to determining that the fourth tilt position of the electronic device is included in a third tilt zone of the second plurality of tilt zones, displaying, at the display of the electronic device, second scrolling information, wherein the second scrolling information is determined based at least in part on the third tilt zone.

13. A memory device comprising executable code that, when executed by a processor of an electronic device, causes the processor to:
receive, from a position or movement sensor the electronic device, at least one position signal;
determine, based on the at least one position signal, a first tilt position of the electronic device;
responsive to determining that the first tilt position has remained steady at a viewable angle for at least a predetermined amount of time:
    store, at the memory device, the first tilt position of the electronic device;
    define a plurality of tilt zones that are in relation to the first tilt position, the plurality of tilt zones including a first tilt zone containing the first tilt position;
    determine, based on the at least one position signal, a second tilt position of the electronic device; and
    responsive to determining that the second tilt position of the electronic device is included in a second tilt zone of the plurality of tilt zones, display, at a display of the electronic device, scrolling information, wherein the scrolling information is determined based at least in part on the second tilt zone; and responsive to determining that the first tilt position has not remained steady at the viewable angle for at least the predetermined amount of time:

determine, based on the at least one position signal, a third tilt position of the electronic device; and responsive to determining that the third tilt position has remained steady at any viewable angle for at least the predetermined amount of time, define the plurality of tilt zones in relation to the third tilt position.

14. The memory device of claim 13, comprising additional executable code that, when executed by the processor, causes the processor to display at the display of the electronic device, the scrolling information by at least increasing or decreasing a scrolling velocity associated with the scrolling information to a target velocity corresponding to the second tilt zone.

15. The memory device of claim 14, comprising additional executable code that, when executed by the processor, causes the processor to display the scrolling information at the target velocity after the scrolling velocity attains the target velocity.

16. The memory device of claim 15, wherein the target velocity is a first target velocity, the memory device comprising additional executable code that, when executed by the processor, causes the processor to:

responsive to determining that a third tilt position of the electronic device is included in the third tilt zone, increase or decrease the scrolling velocity to a second target velocity corresponding to a third tilt zone.

17. The memory device of claim 13, wherein the scrolling information includes one or both of text and imagery, and the position or movement sensor is at least one of a gravity sensor, an accelerometer, and a gyroscope.

18. The memory device of claim 17, wherein the scrolling information includes one or more of a series of messages, contacts information, and web browsing information.

19. The method of claim 1, wherein the predetermined amount of time is 160 milliseconds.

20. The method of claim 19, further comprising:

responsive to determining that the first tilt position has stayed within plus or minus six degrees of separation from the viewable angle for at least the predetermined amount of time, determining, by the processor of the electronic device, that the first tilt position has remained steady at the viewable angle for at least the predetermined amount of time.

\* \* \* \* \*